July 30, 1935.  A. G. RAYBURN  2,009,906
HYDRAULIC TORQUE MULTIPLYING APPARATUS
Filed Dec. 2, 1929   7 Sheets-Sheet 4
Fig. IV
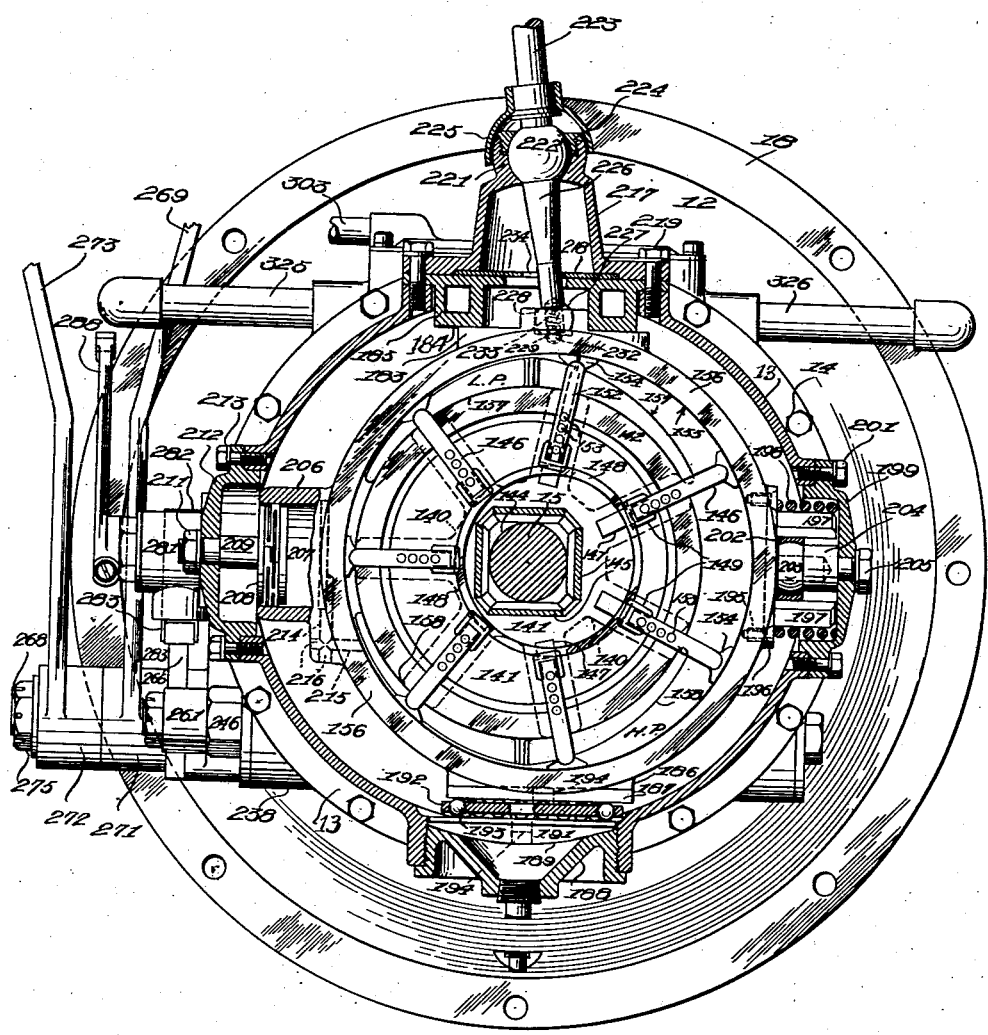
Inventor
Alden G. Rayburn
By Strauch & Hoffman
Attorneys July 30, 1935. A. G. RAYBURN 2,009,906
HYDRAULIC TORQUE MULTIPLYING APPARATUS
Filed Dec. 2, 1929 7 Sheets-Sheet 5
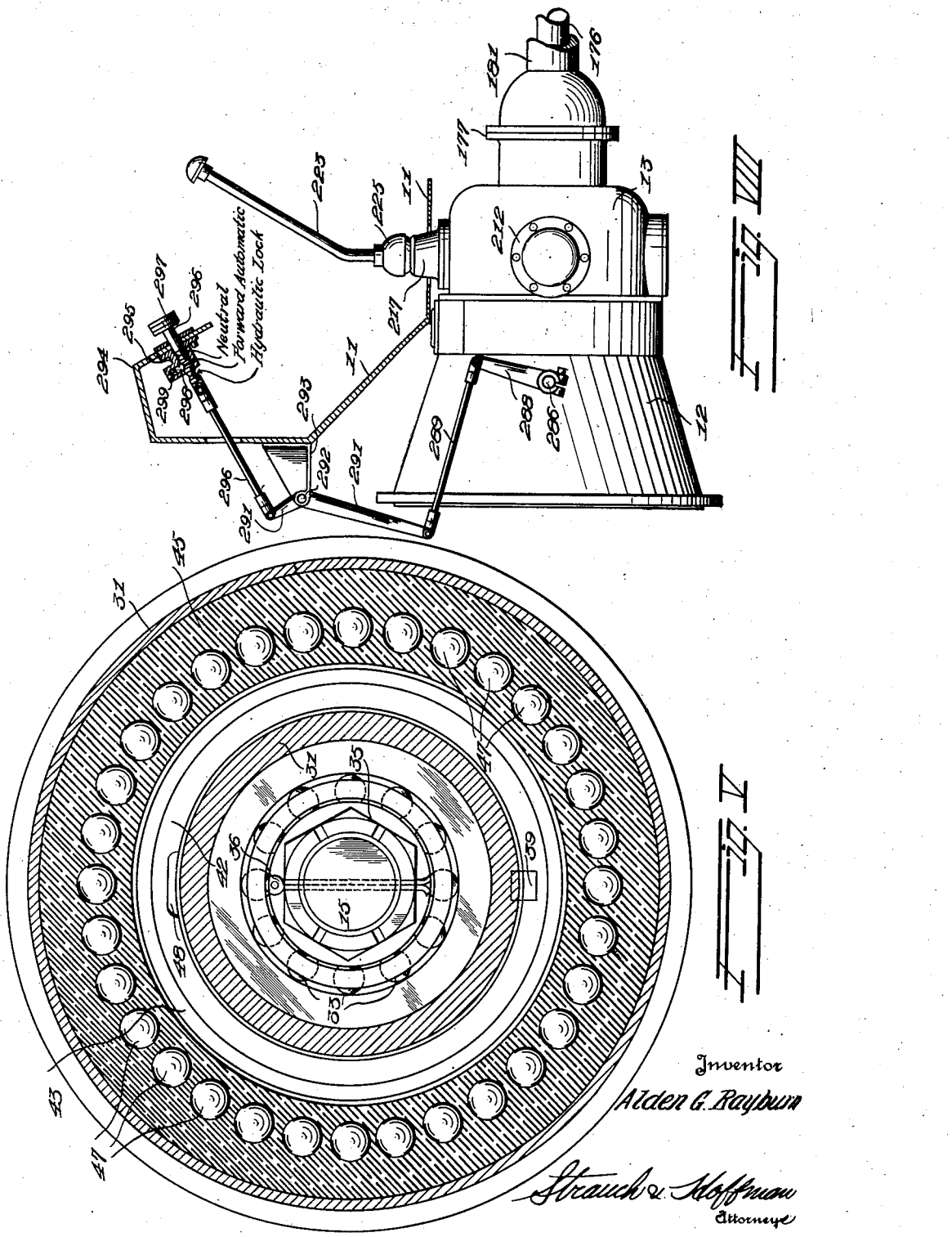

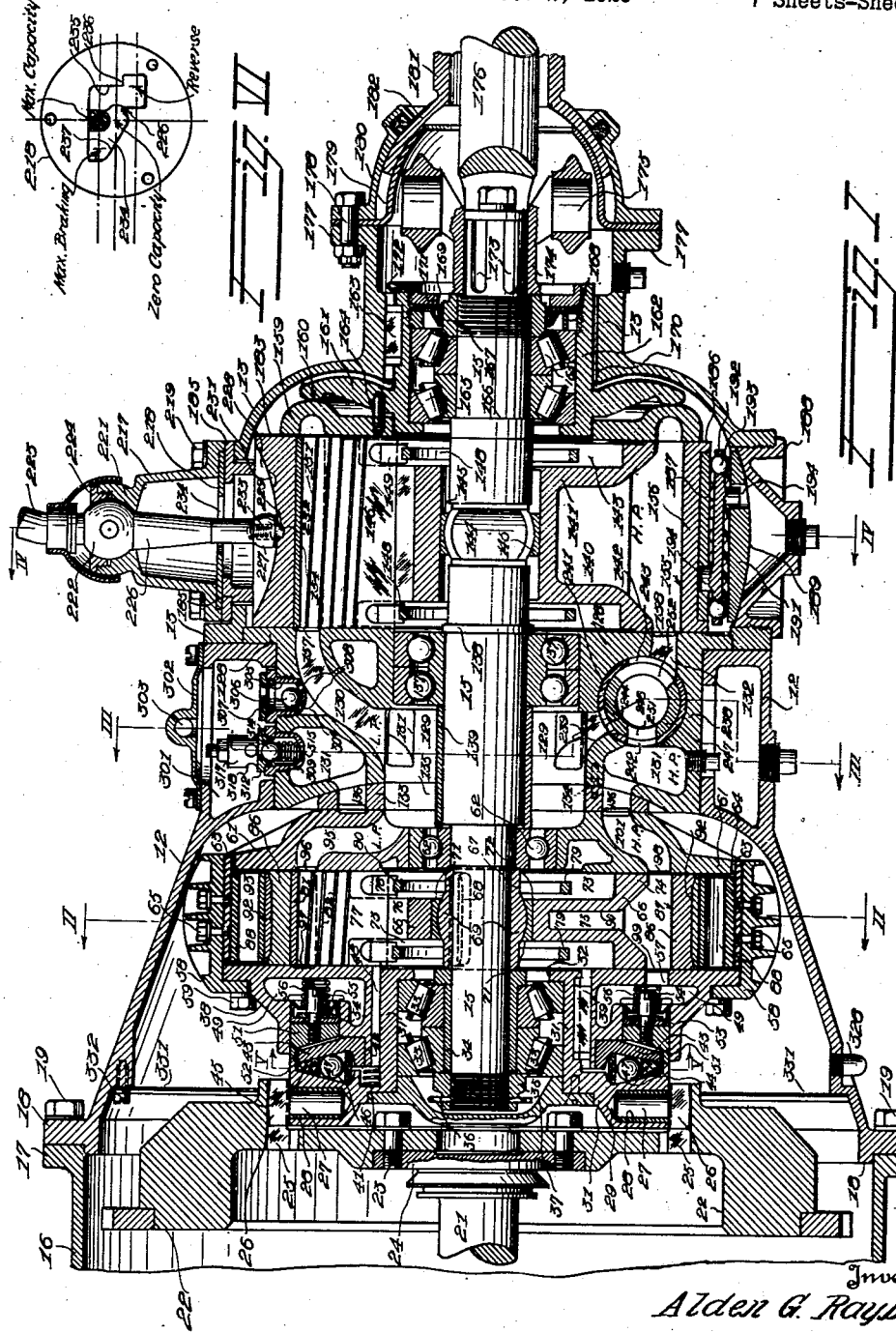

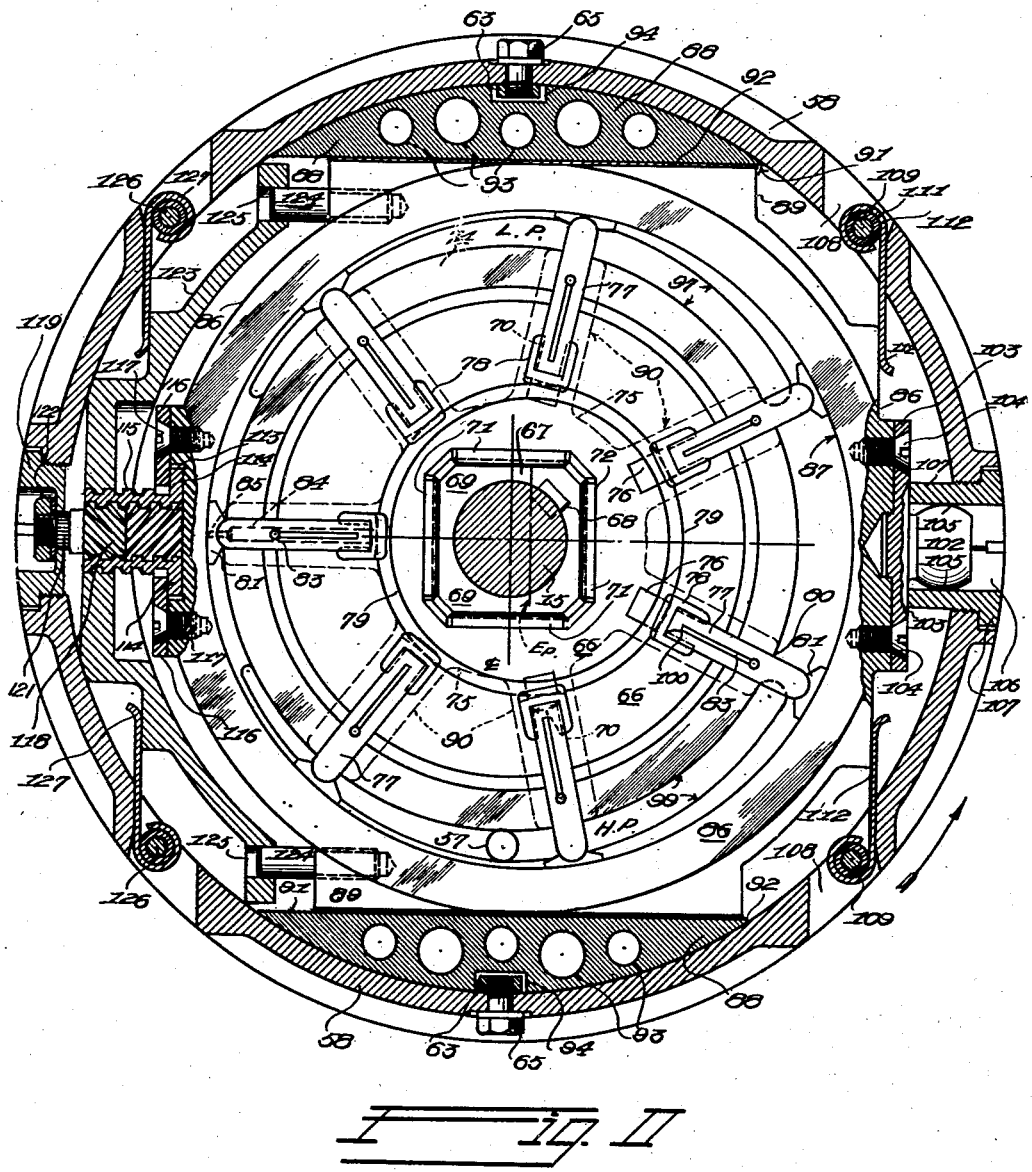
Fig. II

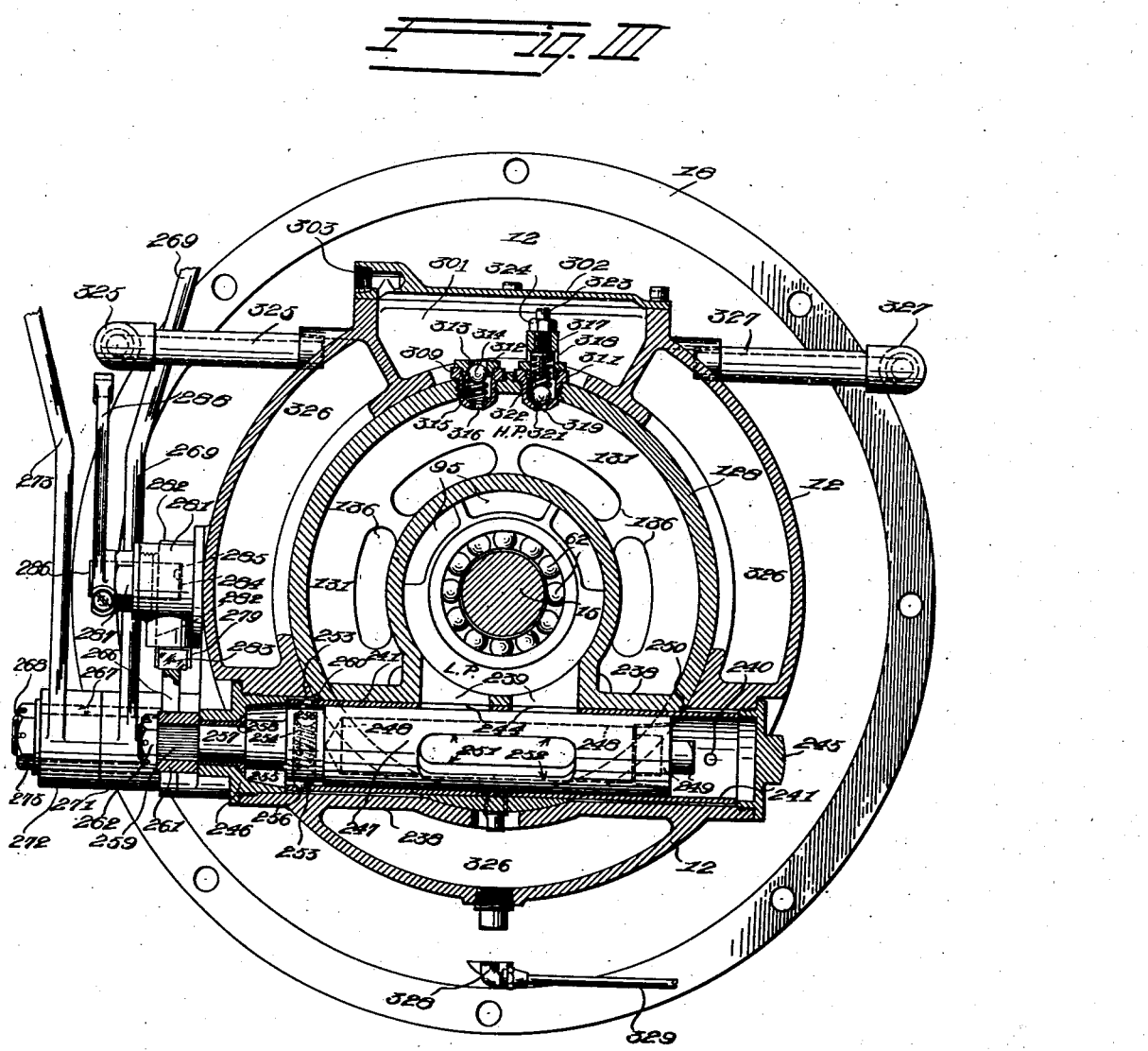

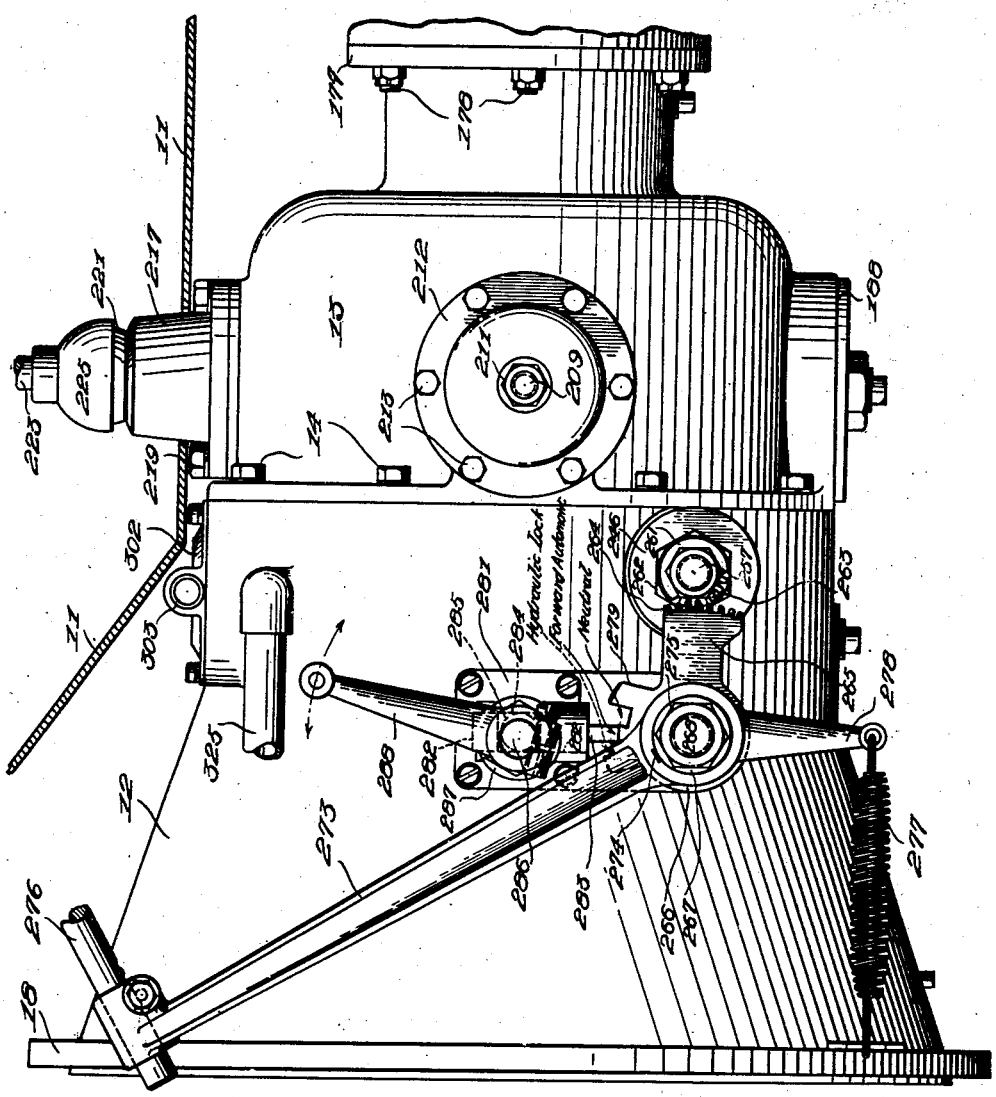

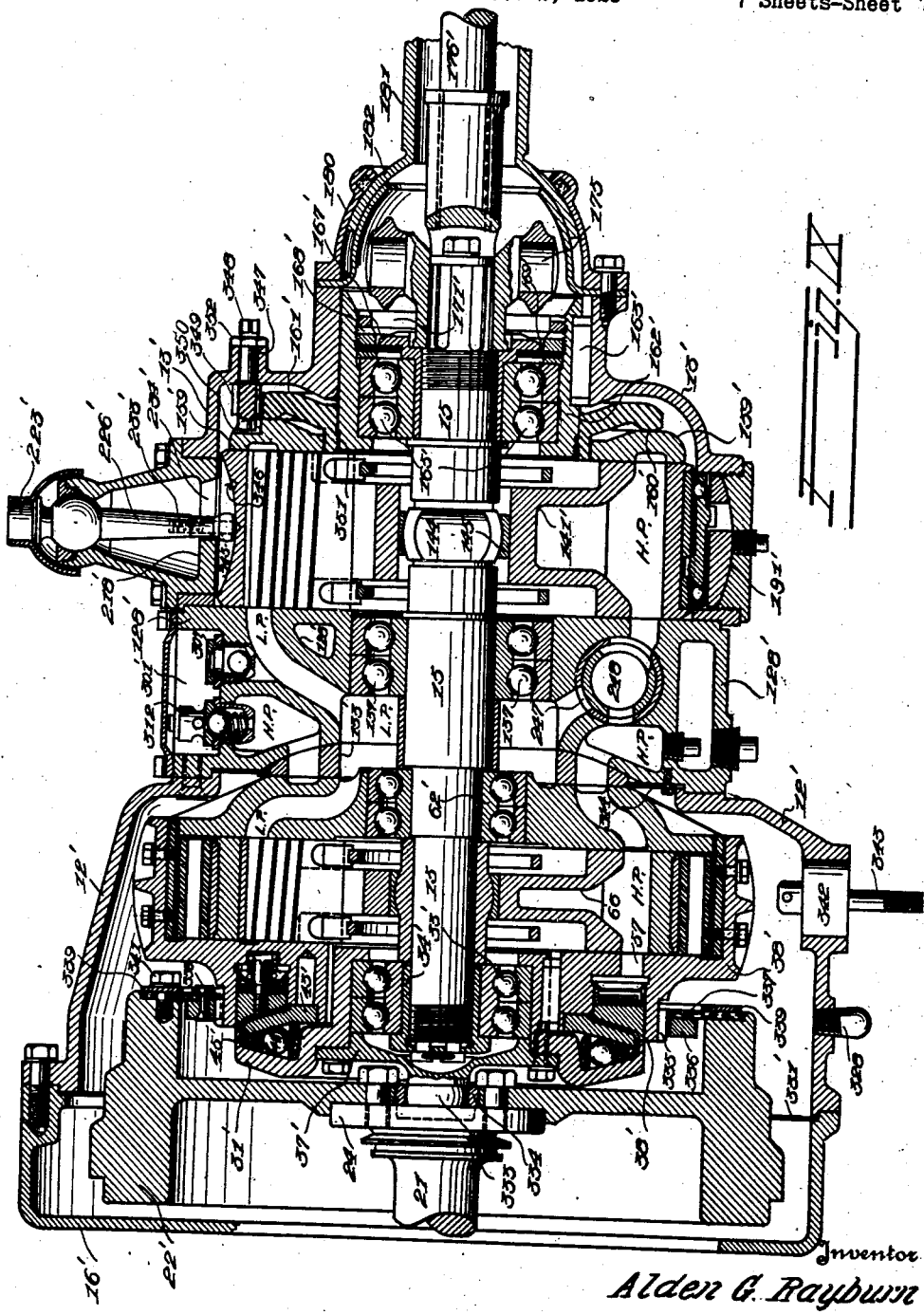

Patented July 30, 1935

2,009,906

UNITED STATES PATENT OFFICE 2,009,906

HYDRAULIC TORQUE-MULTIPLYING APPARATUS

Alden G. Rayburn, Sausalito, Calif., assignor, by mesne assignments, to Automotive Engineering Corporation, a corporation of Delaware Application December 2, 1929, Serial No. 411,191

22 Claims. (Cl. 60—53)

This invention relates to power transmitting apparatus and more particularly to hydraulic torque multiplying and speed changing devices.

The preferred embodiments of the invention hereinafter disclosed are of the type in which fluid is circulated between a pump and a motor, where maximum pumping causes maximum torque multiplication and where the fluid is at rest when the mechanism is in direct couple with the driving and driven shafts rotating at the same speed. In the development of these preferred embodiments, special types of pumps, motors, balancing devices, centrifugally actuated thrust assemblies, and control arrangements have been devised, the principles of which are applicable in various relations independent of those hereinafter set forth, and it is to be understood that the use of such features in other relations is contemplated as within the scope of the present invention.

The apparatus of this invention, although adaptable to numerous uses, has been particularly designed to meet the requirements of a transmission for use with modern high speed automobile engines. Such a transmission must be capable of safely transmitting torque at engine speeds in excess of 2500 R. P. M., its size, weight and cost must compare favorably with those of the mechanical gear units at present in use, and it must require infrequent inspection and repair. The all-rotary type of hydraulic transmission is apparently the only one that has all of these essential qualifications. However, due to temperature changes and wear in such a job, the elements mounted on the driven shaft must be separable to permit expansion and contraction thereof, and yet must have their running surfaces maintained in fluid sealing relationship at all times. When the elements are floated together in separable relation, the pump pressures developed react to cause undesirable separation thereof to break the fluid seals, thus reducing efficiency and permitting entrainment of air and emulsification of the operating fluid. This problem I have heretofore solved by adding a balancing chamber under developed pump pressures and so proportioned with respect to the transmission surfaces, against which the pressure fluid reacts, that the elements are maintained, in fluid sealing engagement with each other. There are, however, further difficulties which are not disposed of by said balancing chamber as will be seen from the following explanation.

In addition to direct fluid pressure reactions, centrifugal action must be considered. The oil or other fluid tends to flow radially outwardly as a body and from all recesses adjacent the driven shaft during rotation of the elements mounted thereon. As the speed increases the centrifugal forces become of such enormity as to force outward radial flow of fluid between the running surfaces, with a resultant separation thereof and a consequent increased leakage. Since these centrifugal forces are not proportional to the pump pressures developed, it will be seen that a balancing chamber of the type above discussed is unable to maintain a fluid seal at all speeds. Furthermore, when the apparatus is in declutched position (direct fluid circulation from one side of the pump to the other) the pressure in the balancing chamber becomes too low to be effective.

Accordingly, it is a primary object of this invention to overcome the above difficulties. More specifically, an object of this invention is to provide means rotating at the same speed as the driven pump element and automatically adjustable, in response to centrifugal action, to urge the running surfaces of the transmission apparatus into fluid sealing engagement at all times during operation of the vehicle. This automatic means may be utilized independently of my fluid pressure balancing chamber but I prefer to use the latter also in order to balance the reactions directly produced by developed pump pressures, whereby the added device of this invention may be more effectively utilized to overcome the separational tendencies produced by centrifugal action on the oil, and to act in declutched position when the balancing chamber has no effect.

As already inferentially stated, a further major object of the present invention lies in the provision of a compact hydraulic transmission unit that is light in weight, small in size, and simple in design and operation. A more specific object is to produce such a unit, operable at relatively low fluid pressures, and adapted for ready substitution, in small vehicles such as the Model A Ford chassis, for the mechanical transmission and clutch at present built into these small vehicles.

A further object is to provide a flexible coupling between the flywheel of the prime mover and the driving member of the pump, whereby a slight longitudinal movement of the driving and driven shafts with respect to each other, or any slight disalignment thereof, has no deleterious influence on the operation of the apparatus. This permits a slight wobbling movement of the rotating parts without binding and without material loss in efficiency.

Another object of the invention is to introduce an aligning plate between the pumping unit and a stationary portion of the motor, which plate is provided with a flat sealing surface and a spherical seating surface, whereby the pump unit is capable of limited universal movement with respect to the motor. This feature cooperates with the flexible coupling above mentioned, to permit the latter to function freely, and vice versa.

A still further object is to improve the automatically variable pump and motor of United States Letters Patent 1,943,929, granted January 16, 1934 on my copending application Serial Number 380,357, filed July 23, 1929.

Another object is to provide improved means for establishing communication between the internal fluid passages of the apparatus and the fluid supply reservoir.

It is also an object of this invention to equip a hydraulic transmission unit with a valve that is selectively adjustable to several positions to place the unit in direct hydraulic lock, forward automatic, or neutral; to provide a single operating means for so positioning said valve; and to employ means that must be manipulated prior to said operating means for the valve, to predetermine the position to which the latter may be shifted.

A further object lies in the provision of manually operable means for shifting a rotary motor from forward into reverse and vice versa, and for varying the capacity (eccentricity) of said motor.

Other objects of the invention are such as may be attained by a utilization of the various combinations, sub-combinations and principles hereinafter set forth in the varied relations to which they are obviously applicable by those skilled in the art.

The invention will be best understood and further objects will appear from a study of the following detailed description taken in connection with the accompanying drawings, with the understanding, however, that the invention is not confined to any strict conformity with the showing in the drawings, but may be changed and modified as long as such changes and modifications mark no material departure from the salient features of said invention as expressed in the appended claims. In the said drawings:—

Figure I is a vertical sectional view taken longitudinally through one illustrated embodiment of my invention.

Figure II represents an enlarged vertical section taken on line II—II of Figure I, with the rotor body and blades of the pump shown in elevation and slightly rotated from their position in Figure I.

Figure III is a vertical section taken on the irregular line III—III of Figure I, with the control valve shown in side elevation.

Figure IV represents a vertical section taken along line IV—IV of Figure I, with the rotor body and blades of the motor shown in side elevation and slightly rotated from the position illustrated in Figure I.

Figure V is an enlarged partial vertical section somewhat distorted, taken along line V—V of Figure I, with the adjacent bearing and its retaining nut shown in end elevation.

Figure VI is a plan view of the slotted cam plate that is located just above the motor in Figure I, with the shifting lever illustrated in section to show its cooperation with the cam slot.

Figure VII shows, in side elevation, the complete assembled transmission unit of Figure I, and the controlling devices mounted thereon.

Figure VIII illustrates, somewhat diagrammatically, the complete unit of Figure I, disposed beneath the floorboards of an automotive vehicle, with a selective manipulating device connected between the unit and the dash of the vehicle body.

Figure IX shows, in vertical section, the apparatus of Figure I, redesigned to fit into the chassis of the present standard Model A "Ford" vehicle. This form, though shown as a modification, represents the preferred embodiment of my invention. The sections and controlling devices, associated with Figure I, and shown in Figures II–VIII inclusive, are substantially the same as would be drawn with Figure IX as a base figure.

In the drawings briefly described above, and in which like reference characters designate like parts, the transmission mechanism is shown completely assembled in Figures I, VII and IX and adapted to be mounted in any suitable manner between a source of power and a driven shaft, with its forward (left) end arranged to be driven from said power source and its rear (right) end adapted to transmit multiplied torques to said driven or take-off shaft. Although the units, as shown, are disposed beneath the floorboards 11 of an automotive vehicle, it will readily be understood that they may be utilized in a great variety of analogous combinations. In this connection, it should also be understood that various features of construction and principles of operation of certain elements and arrangements thereof such, for example, as the pump, motor, balancing devices and control mechanisms may be used independently of the particular combinations shown either with or without modification.

With particular reference to Figures I and VII, the housing proper for the transmission mechanism is made up of two parts, a standard bell housing 12 and a rear housing 13, with their meeting open ends drawn together in fluid sealing relationship by bolts 14. The bell housing 12 is shaped to surround the pump and fluid distributing section and the rear housing 13 to surround the motor. A single shaft 15 is supported centrally of these housings in a manner to be described later, with its ends terminating adjacent the front and rear ends of the respective housings 12 and 13.

As seen at the left end of Figure I, a flywheel casing 16 has an annular flange 17, aligned and supported on a corresponding locating flange 18 of housing 12 and secured thereto by bolts 19. The crank shaft 21 of a combustion engine (not shown) is disposed centrally of casing 16 and in alignment with transmission shaft 15. A flywheel 22 is secured, by bolts 23, to a flange 24 rigidly carried by said crank shaft. The flywheel is adapted to drive a portion of the pump, as will be seen from the following descriptive matter.

At diametrically opposite points the flywheel has a pair of slots 25, parallel to the crank shaft and adapted to receive freely and carry the heads 26 of a pair of coupling elements 27. The bodies of these elements project radially into bearing bushings 28 that are tightly fitted in the radial sockets 29 of an irregularly shaped reactance member 31. The outer surfaces of heads 26 are smoothly curved as shown, to render the driving coupling flexible to prevent binding and damage if the axes of the flywheel and reactance member should become slightly disaligned as they rotate in unison. The rear end of reactance member 31 terminates in an inturned annular flange 32 which reacts against the outer race of one of a pair of roller bearings 33. These bearings are oppositely inclined in abutting relation, supported on a sleeve 34 that surrounds the shaft 15, and their inner races are maintained in position by a nut 35 threaded on the end of shaft 15 and locked thereon by a pin 36. A cap 37, secured to reactance member 31 (as by countersunk machine screws) covers the end of the shaft and reacts against the outer race of the forward bearing. A specially shaped pump wall 38 is mounted, by virtue of keys 39, to be rotated by said reactance member and yet longitudinally slidable with respect thereto. Compression springs 40 constantly react against the reactance member 31 and tend to thrust the pump wall rearwardly.

Pump wall 38 has a cylindrical hub portion 42 upon which is mounted a forwardly inclined collar 43. This collar cooperates with reactance member 31 to form an annular chamber 44 which is substantially triangular in cross section. A wedge-shaped annular ring 45 is disposed in chamber 44 in contact with the walls thereof. Ring 45 is made of deformable material, such as high grade rubber, and has a circular series of slots 46 cut therein to receive a plurality of hardened steel balls 47. For a complete disclosure of this device reference should also be had to Figure V. It will be observed that, as the flywheel and reactance member rotate, the steel balls move radially outward in response to centrifugal forces, and in so doing they deform the rubber and react against reactance member 31 to wedge the collar 43 and pump wall 38 toward the right in Figure I. This action is incremented by the outward pressure of oil against the inner wall of ring 45, such oil being fed to the space between member 31 and collar 43 by way of a passage 48 that is cut through pump wall 38 into the interior of the pump.

Pump wall 38 is cored out and machined to form an annular chamber 49 which opens toward the speed responsive device just described. A ring-shaped piston 51 is fitted for longitudinal reciprocation in the open side of said chamber. Portions of this piston and the reactance member 31 are extended to abut each other as at 52 in order to obtain a clearance between the piston and the collar 43 and thus provide direct reactance for the piston against member 31. A ring-shaped sealing leather 53 abuts the rear side of piston 51, being held in such relation by a series of screw and washer assemblies 54. An annular steel ring 55 is pressed into sealing engagement with the edges of leather 53 by a set of coil springs 56 which are compressed between said steel ring and a vertical surface of the annular chamber 49. A hole 57 extends through pump wall 38 to establish communication between chamber 49 and the high pressure side of the pump (as will later become apparent), the result of this being that whenever the pump is under load it places the oil in chamber 49 under high pressure. This pressure reacts against the steel ring and leather face of piston 51 and forces pump wall 38 toward the right.

A pump housing ring 58 having a cylindrical bore is secured to pump wall 38 as by bolts 59. A fluid distributing pump wall 61 is received within said housing ring in spaced relation from wall 38 (to form a rotor chamber) and is mounted upon a radial ball bearing 62 carried by the transmission shaft 15. Wall 61 is caused to rotate with wall 38 and ring 58 by means of a pair of keys 63 that project freely through slots 64 in the periphery of wall 61 and that are fixed with respect to ring 58 by radial bolts 65.

With particular reference to Figures I and II, a pump rotor body 66 is radially mounted upon a square type universal joint for rotation with the shaft 15. The said joint, which is shown and described in greater detail in my above mentioned Patent No. 1,943,929, comprises a driving sleeve 67 keyed as at 68 to a reduced portion of shaft 15, with its ends abutting sleeve 34 and bearing 62 respectively, and provided with four integral enlarged portions 69 arranged in two pairs with the outer surface of each portion cylindrically curved about an axis perpendicular to that of the shaft; and a wearing strip 71 fitted upon each cylindrical portion with its outer surface flat to slidably engage the corresponding flat surface provided by a side of the substantially square hole 72 formed in the rotor body 66. This construction permits the rotor to float freely between the pump walls and automatically prevent any rocking or cocking of the rotor which would otherwise result from such causes as deflection of shaft 15 and any minute disalignment of rotating parts.

The joint is limited in width and the central side surfaces of the rotor are relieved to provide internal cylindrical chambers 73 and an outer rim 74. Radial chambers 75 reduce the weight of the rotor body and, in effect, split the rotor into two parts in such manner that fluid pressures in chamber 75 counter-balance any reactions that tend to force the opposite faces of rim 74 out of sealing engagement with the respective pump side walls. Chambers 75 have a further function, to be explained later. A plurality of radial slots 76, equally spaced apart and of substantially the same width as the rotor, are formed in the rotor body to reciprocably receive a corresponding number of rectangular vanes 77. Each corner of the inner end of each blade has a pair of longitudinal grooves 78 in which is clipped a shoe 78, which shoe in turn rolls and slides upon the peripheral surface of a slightly resilient equalizing ring 79. There are two rings 79, one in each internal chamber 73, and they are maintained in position by the edges of shoe slots 80 which receive them. The outer ends of the vanes project through and beyond the rotor rim 74 and are curved to receive rockable compensating slippers 81. The vane surfaces are provided with transverse oil grooves 82. Their edges are provided with radial oil grooves 83. An internal radial oil conduit 84 is drilled from the inner end of each vane and communicates with a passage 85 in the slipper, whereby all the blade and slipper surfaces are fully lubricated by oil fed from the center of the rotor by centrifugal action.

A floating control ring 86 of substantially the same width as the pump vanes receives the rotor with its cylindrical inner surface 87 slidably engaging the cylindrical outer surfaces of slippers 81 and thus forming the outer periphery of the pump chamber proper. This control ring is mounted and floated between diametrically opposite aligning members 88, the ring having flat-surfaced bosses 89, between which and adjacent flat surfaces 91 of the members 88, are disposed a pair of thin anti-friction bearing sheets 92. Members 88 contain holes 93 which reduce their mass, and are slotted, as at 94, to freely receive the same keys 63 that were provided to lock pump wall 61 and external housing ring 58 together. As seen in Figure II, the control ring 86 may be horizontally reciprocated, between members 88, to vary the eccentricity (capacity) of the pump. In the illustrated position the ring has been carried as far as it can go to the right, bringing its vertical center line to the position of eccentricity indicated by line Ep, thus forcing the blades at the left side of the rotor into their slots and causing, by virtue of the equalizing rings 79, the blades at the right to assume distended positions. At this time the pump capacity is maximum, but when the ring 86 is moved to the left until its vertical center coincides with the indicated center line of the rotor assembly, it becomes concentric with shaft 15 and the pump capacity becomes zero. Automatic shifting of ring 86 to vary the eccentricity is obtained in a manner later to be set forth.

The radially disposed chambers 75 in the rotor rim, previously described, serve to maintain the sides of the blades in surface engagement with the walls of the slots in which they reciprocate. As each blade rotates past the low pressure suction ports and thereafter places the fluid ahead of it under high pressure, such pressure, together with any resistance offered to rotation by the surrounding bore 87 of the control ring, normally tends to rock the blade slightly and throw its center line out of alignment with that of the slot. The extent of this movement is, of course, limited by the clearances between the blade and slot surfaces. For example, in Figure II, the trailing surface of that blade just encountering the H. P. groove 99 has a tendency to rock on the rotor edge as indicated at 80, and the leading edge of said blade has a tendency to bite into the slot wall as at 100. This not only tends to reduce the effectiveness of the fluid seal between the interior of the pump and the working chambers thereof, but also to damage the parts as they reciprocate relative to each other in line contact. To eliminate these disadvantages I have provided the chambers 75, the walls 90 of which are reacted upon by fluid pressure to cause them to become slightly distorted and moved toward the adjacent blades, whereby the radial surfaces of the slots are firmly pressed into fluid-sealing surface engagement with the blades at all times.

The flywheel, reactance member 31, the pump side walls, and all the pump parts outside (radially) of the slippers 72, rotate as a unit in a counter-clockwise direction (as viewed in Figure II). Operating fluid, preferably oil, is fed at low pressure through the L. P. passages 95, formed in the rear side wall, into the spaces between the outer ends of the pump vanes. Passages 95 terminate in a port 96 grooved on the inner face of said side wall, and a corresponding groove 97 is made directly opposite port 96 on the other side wall. Diametrically opposite the low pressure side of the pump the high pressure side is provided with a similar pair of grooves 98 and 99. The oil is discharged under pressure through port 98 and H. P. passages 101 formed in the rear side wall of the pump.

The control ring 86 is provided (see right side of Fig. II) with a spherical ball extension 102 that is formed on a plate 103 which is rigidly secured to said ring by machine screws 104. Ball 102 seats in several-point contact, as at 105, within a hexagonal opening 106 formed in a socket member 107 that is threaded through the wall of external housing ring 58. This mounting arrangement permits horizontal reciprocation and a slight universal movement of control ring 86. A pair of vertically aligned slots 108 are cut in the outer ring, each receiving a pivot pin 109 that is fitted into said ring. Each pivot pin carries a bushing 111 and a strong flat spring 112, the latter being so shaped and related to adjacent portions of rings 58 and 86 that it reacts against them with a constant tendency to thrust ring 86 toward the left (zero eccentricity).

Diametrically opposite the ball 102 and plate 103, control ring 86 has a cylindrical recess 113 which freely receives the annular flange 114 of an internally and (opposite) externally multiple threaded sleeve 115. A plate 116 surrounds sleeve 115 and is secured to ring 86, by machine screws 117, in such manner that flange 114 is rotatably held within the recess 113. The internal spiral threads of sleeve 115 engage corresponding external multiple threads formed on a comparatively short spindle 118, which latter is immovably mounted, against both rotary and reciprocatory movement, by means of a cap 119 that engages a serrated portion 121 of said spindle and by means of a nut 122 threaded upon the outer end of said spindle. The external reversed threads of sleeve 115 have twice the lead of the internal threads and are spiraled into the center of a segment 123 which is designed to counterbalance the weight of the pump parts and fluid as they move away from true center. It will thus be seen that when control ring 86 is shifted toward the right, segment 123 is carried an equal distance to the left, and vice versa. A pair of horizontal guiding pins 124 are carried by ring 86 with their ends slidably received in holes 125 in the segment 123. These pins also prevent rotation of said segment. A pair of pins 126 and springs 127, similar to those (109 and 112) previously described but reacting in the opposite direction thereto, are vertically aligned at the left side of Figure II, the ends of said springs engaging the segment 123. All four of the springs are of substantially the same strength and are normally curved (in zero capacity position of the pump). When straight, as illustrated, they are under flexure and have stored up potential energy.

The mass and disposition of the segment 123 are so estimated as to substantially counter-balance the distended eccentric portions of the floating ring 86 and rotor blades, plus the excessive weight of the operating fluid on the right hand side, at any given speed of rotation. When the flywheel is stopped or running at low speed, centrifugal force will not be great enough to overcome the resistance of springs 112 and 127, all of which are urging the ring toward its position of concentricity. At such time the capacity of the pump is zero and no fluid is received or delivered. However, when a certain flywheel speed is attained, predetermined by the proportioning of the pump parts and spring resistances, the control ring 86 floats eccentrically toward the right. Simultaneously, centrifugal force causes counterbalancing segment 123 to overcome springs 127 and move toward the left, this movement being permitted and measured by the rotation of spirally threaded sleeve 115 within the segment and upon the spindle 118. The pump is thus maintained in a substantially balanced condition, with its eccentricity automatically governed by speeds of rotation.

Behind the pump a cast, fluid distributing block 128 is tightly inserted in the rear end of bell housing 12, and is held in such inserted position by the rear housing 13. Block 128 is provided with 75 a central fluid reservoir 129 which communicates with exhaust or low pressure passages 130 for the motor, and also is provided with an annular outer fluid reservoir 131 which communicates with the inlet or high pressure passages 132 for the motor. It is further equipped with several valves, but description of these will be deferred until the motor has been described. An aligning plate 133 is floated between the pump and the distributing block, being fixed against rotation by a pin 134, the opposite ends of which project loosely into the block and plate respectively. This plate 133 has a central hole 135 establishing communication between the low pressure pump passages 95 and low pressure reservoir 129, and a plurality of through ports 136 establishing communication between the high pressure pump passages 101 and the high pressure reservoir 131. The left face of the aligning plate is flat to provide a proper running surface for the rotating pump, and its right (rear) face is spherically curved in order that it, and the pump, may have a universal seat upon the block 128. It will be observed that this feature cooperates with the flexible driving coupling 25, 26 etc., each permitting the other to act without restriction, and that binding of parts and damage thereto, such as scoring caused by shaft flexure or shaft disalignment, are eliminated.

Shaft 15 is journaled in stationary block 128 by means of a double ball bearing 137. The latter is maintained in position by an integral shoulder 138 on the shaft and a sleeve 139 mounted on the shaft with its ends abutting bearings 137 and 62 respectively. The rear face of the block 128 is flat and smooth and forms one wall of a rotary motor now to be described.

The rotor of the motor (see Figures I and IV) is of substantially the same construction as that of the pump, except that it is approximately twice as wide. It comprises a rotor body 141 having a rim portion 142 providing radial chambers 140 surrounding internal side chambers 143, and universally mounted upon a substantially square portion 144 of shaft 15 by means of four wearing strips 145; and a set of radial blades 146 slidably mounted in slots 147 in the rotor with equalizing rings 148 arranged in the chambers 143 to engage shoes 149 to press the blades outwardly. The flat surfaces of the blades have oil grooves 151, and internal oil passages 152 are drilled radially through the plates to supply oil to cross passages 153 and to the blade tips. Rockable slippers 154 are mounted on the blade tips with their outer surfaces in sliding engagement with the internal cylindrical surface 155 of a control ring 156, which latter though differing in construction and manner of operation from the pump control ring 86, is horizontally reciprocable, like said pump ring, to vary the eccentricity (capacity).

The low pressure passages 130 in the distributing block 128 terminate in a specially shaped port 157 to receive fluid exhausted from the motor, and the high pressure passages 132 terminate in a similar port 158 for delivering fluid to the high pressure side of the motor. The working chambers of the motor are closed at the rear by a wall 159 that is slidably mounted on the hub portion 162 of a reactance member 161, and pressed toward the left by circular contact with said reactance member, as at 160. Hub portion 162 is slidably keyed, as at 163, in the rear end of housing 13, and wall 159 is in turn prevented from rotating by a pin 164 the ends of which project freely into elements 159 and 161 respectively. The hub 162 provides a cage for a pair of oppositely inclined roller bearings 165 which are held in position upon the shaft 15 by a shoulder 166 and a nut 167 on the shaft, and an externally threaded nut 168 screwed into an end of the bearing cage. A sealing assembly 169 is pressed against nut 168 by a lock nut 171, relative rotation of the latter being prevented by a cotter pin 172. The end of shaft 15 is splined as at 173 to drive the sleeve 174 of a universal joint, designated generally by numeral 175, and thence to drive a propeller shaft 176. This is a conventional arrangement, as employed, for example, in the Model A Ford chassis, to drive the rear wheels of a vehicle. The end of housing 13 has a flange 177 to which bolts 178 secure a pair of radially spaced spherical segments 179 and 180. A torque tube 181 has a spherically curved end 182 which slidably fits between segments 179 and 180 to permit universal movement of said torque tube while preventing longitudinal movement thereof. Any oil accumulating in the space surrounding universal joint 115 is permitted to drain to the lower side of the motor housing by way of a slot 176 provided in housing 13 adjacent the bearing cage 162.

The control ring 156 of the motor is shiftable horizontally to vary the eccentricity, either manually or automatically. Unlike the pump ring, it does not rotate, and it may be shifted either to the right or left of a zero capacity position, whereby the motor is reversible. As illustrated in Figure IV it is in its extreme right hand position, with the rotor turning in the same direction as the flywheel, to drive the vehicle forward. At its upper side ring 156 has a flat surfaced boss 183 that slides on a corresponding surface 184 of a cap 185 mounted in the upper side of housing 13. The lower side of ring 156 has an integral extension 186 which receives a horizontal flat plate 187. Spaced below this plate a closure cap 188 is screwed into an opening in housing 13 and provides a seat for the spherically curved face 189 of a plate 191. The center of curvature of face 189 is located in the axis of shaft 15 centrally of the square joint 144. Between the plates 187 and 191 there is disposed a bearing pad 192 in which are freely mounted a plurality of steel balls 193 which may slide and roll on the surfaces of said plates. Pad 192 has a pair of pins 194 disposed diametrically opposite each other at equal distances from the vertical center line of the rotor, one of these pins projecting upwardly into a hole in plate 187, and the other projecting downwardly with a loose fit into a hole in plate 191. This permits an anti-frictional gyratory movement of the balls when the control ring is shifted horizontally while being supported and guided between the devices above described.

It will readily be understood that such a supporting and guiding means as this may be substituted for that shown at the bottom of the pump control ring 86.

At its right side (Figure IV) control ring 156 has secured thereto, by screws 195, a plate 196 which carries several horizontally projecting fingers 197. A heavy compression spring 198 is coiled around these fingers with one end reacting against plate 196 and its other end reacting against the inside surface of a closure cap 199 that is secured to housing 13 by bolts 201. Spring 198 constantly urges the control ring toward its concentric position. The fingers 197 are supported and guided on an anti-friction bearing member 202 that is carried by the ball end 203 of a spindle 204, the latter being rigidly held in position by a nut 205 threaded on its outer end.

Diametrically opposite the mechanism just described, the left side of control ring 156 has formed thereon a cup-shaped extension or cylinder 206 having an internal working chamber 207. A piston 208 fits within chamber 207 and is stationarily supported by a piston rod 209 the outer end of which is secured by a nut 211 to a closure cap 212, the latter in turn being secured to housing 13 by means of bolts 213. A pair of intersecting passages 214 and 215 have their ends open to chamber 207 and the high pressure side of the motor respectively, thus establishing constant communication between said chamber and said high pressure side. The intersecting ends of these passages, necessarily opened to the control ring surface during the drilling operation, are closed by plugs of any suitable material, as indicated at 216, to prevent leakage into the space around the motor. When the developed pump pressure exceeds a predetermined value, which value is partially determined by the area of piston 208 and the resistance of spring 198, it acts upon the right hand face of piston 208 (having been transmitted thereto via the high pressure side of the motor and the passages 214, 215) and forces the cylinder 206 and control ring 156 toward the right. This produces a slight eccentricity of the motor and renders it operative to drive the propeller shaft 176. Any further movement of the control ring to right or left is dependent upon fluid pressures and, since the latter are proportionate to the resistance of the propeller shaft to rotation, it will be seen that the capacity of the motor is automatically variable in response to the torque demands imposed by the driven wheels of the vehicle.

During the time that the motor is permitted to operate as above described, it is in what may be termed its "Forward automatic" position. Since the pump and motor may be run at different effective speeds, and since, the eccentricity of the pump being variable also, the pump may be near its zero capacity and delivering a very small quantity of fluid to the motor when the latter, which is larger than the pump, is in its illustrated position of maximum capacity, the relative capacity of the motor may become as great as three hundred times the capacity of the pump at a given instant. It follows that the motor may drive the propeller shaft at one three hundredth of the flywheel speed, and there being substantially no slip in my transmission unit, a torque multiplication ratio of approximately 300:1 may be obtained.

The motor control ring 156 is subject to manual, as well as automatic control. A bracket 217 is mounted upon the cap 185 at the top of the motor, with a cam plate 218 therebetween, and secured to housing 13 by bolts 219. Bracket 217 has a socket portion 221 which receives the ball 222 of a shifting lever 223, said ball being retained in place by a nut 224 and housed by a spherical cap 225. Ball 222 rigidly carries a downwardly projecting shifting extension 226, the lower end 227 of which is ball-shaped and adapted to slide in an arcuate groove 228 cut in the control ring about a center located within ball 222. In the lower surface of groove 228 there are a pair of recesses 229 and 231 each of which is adapted to receive and yieldably retain a ball 232 that may be positioned, upon shifting the lever to proper positions to be snapped downwardly into said recesses by a compression spring 233 carried within the end 227 of the shifting extension 226. These devices are used to locate certain positions of the shifting lever and to resiliently latch it in such positions, as will now appear.

An irregular cam slot 234 of special shape is cut in the cam plate 218 to act as a guiding, positioning and limiting means for the extension 226 of the shifting lever. With particular reference to Figure VI, the extension 226 is shown at that one of its extreme lateral positions in which its center line passes through a point indicated as "Maximum capacity" which position corresponds with those of the motor parts as illustrated in Figures I and IV, with the ball 232 latched in recess 229. If the lever is shifted laterally to move extension 226 toward the indicated "Zero capacity" position, the ball 232 remains in recess 229 and forces control ring 156 into concentricity with the motor rotor and shaft. To reverse the motor, lever 223 is shifted forwardly (longitudinally) thus moving extension 226 rearwardly until it engages edge 235 of the slot. It is then guided laterally and forced rearwardly into the position indicated in Figure VI as "Reverse", at which time the control ring 156 of the motor has reached its extreme left hand position of eccentricity. During this movement the ball 232 has popped out of recess 229 and dropped into recess 231. The edge 236 of the cam slot now abuts one side of extension 226 and prevents the automatic motor control mechanism from shifting the control ring while in reverse.

During normal forward running, however, the cam slot permits the extension 226 to play back and forth laterally, between the "Zero capacity" and "Maximum capacity" positions in response to the action of the automatic control mechanism. If it is desired to use the transmission unit as a vehicle brake, as when traveling down hill, at which time the capacity of the motor is at or near zero because the vehicle wheels and propeller shaft have a tendency to travel faster than the flywheel, it is only necessary to pull backward gradually on shifting lever 223. This causes extension 226 to move forwardly along a cam slot edge 237 that is so inclined as to simultaneously shift the extension laterally toward a point marked "Maximum braking". At this time the motor is approaching maximum capacity and acting as a pump to supply more fluid to the pump proper (which now acts as a motor) than said pump proper can normally handle. This produces an enormous resistance to rotation of the motor and propeller shaft and hence brakes the vehicle. To coast with practically no resistance the pump is allowed to go to zero capacity, and the motor also, at which point no fluid flows and the parts are all in balance and free to rotate at high speeds.

During all of the preceding descriptions and expositions it has been assumed that the distributing passages 132 have been open to establish communication between high pressure reservoir 131 and the inlet side of the motor. However, means under the control of the operator are provided for completely closing passages 132 or interconnecting them directly with the low pressure reservoir 129, as follows:

With particular reference to Figures I and III, the fluid distributing block 128 is so cast as to provide a valve housing 238 interrupting the H. P. passages 132. A pair of short-circuiting passages 239 are formed in block 128 to establish communication between the L. P. reservoir 129 and the interior of said valve housing. A liner 241 is inserted in the valve housing to form a valve chamber proper, said liner being provided with ports 242, 243 and 244 for connecting the valve chamber with the H. P. reservoir 131, the H. P. passages 132, and the L. P. short-circuiting passages 239, respectively. The liner has a tight fit and is maintained in position by an end plug 245 and an end cap 246 which screw into housing 12 to abut the ends of said liner.

A cylindrical oscillating valve 247 is mounted in liner 241. This valve is provided with a central bore 248, closed by an end plug 249, a narrow elongated port 251, and a wide elongated port 252. When the valve is in the position illustrated, its port 251 establishes communication between its central bore 248 and the H. P. chamber 131, with its port 252 connecting said central bore with the H. P. passages 132 that lead into the motor. At this time the short-circuiting passages are blanked off, and the transmission is operating in "Forward automatic". If the valve is oscillated clockwise in Figure I until its port 251 overlaps the liner ports 242 and 244 the circulating fluid is short-circuited between the H. P. and L. P. reservoirs with the result that no operating pressures of sufficient magnitude to drive the motor are transmitted thereto. This position may be termed "Declutching" and it is to be utilized prior to manipulation of the shifting lever to secure reversal or to multiply torque at the will of the operator. If the valve is oscillated in the opposite direction, past the illustrated position, until ports 242 and 248 pass totally out of communication and the former is blanked by the valve surface, the pump has no place to deliver high pressure fluid and as a result its rotor and housing are hydraulically locked together for rotation as a unit to drive the driven shaft 15 independently of the motor. This position of operation, which is highly desirable after a relatively high vehicle speed has been obtained as when driving on interurban highways and country roads may be aptly designated as "High". In such position the motor is wholly under low pressure and doing no work, the bearing 165 increases its load-carrying capacity and the fluid, not circulating, is given an opportunity to become cooled.

In order that the valve may be properly inserted and its actuating mechanism properly assembled, I provide recesses 253 in the liner at predetermined points (see Figure III) and, in a transverse passage 254 in the valve, I arrange a compression spring 255 for snapping portions of locating balls 256 into said recesses as the valve is oscillated to the position illustrated. To prevent any fluid leaking into the chambers at the ends of the valve from building up pressures therein, a port 240 is provided near the right end of liner 241 (see Figure III) which permits fluid to escape to the outer surface of the liner and thence to the space within housing 12 by way of a longitudinal groove 250 cut on the surface of the block 128. A similar groove 260 is provided at the left end of the valve but a port corresponding to port 240 is unnecessary because of the presence of the holes 253.

With reference to Figures III, IV, and VII, one end of the valve 247 is provided with an integral stem 257 journaled in a bearing 258 within the end cap 246, said stem having a serrated portion 259 receiving an actuating sleeve 261 that is held in position by a nut 262. Sleeve 261 has a toothed segment 263 in cooperative engagement with the teeth 264 of another segment 265, the latter constituting an extension of a manually oscillatable plate 266. The plate 266 has a sleeve portion 267 journaled on a horizontal spindle 268 that is rigidly supported by the transmission housing. A foot brake lever 269 has its hub portion 271 freely fulcrumed on the sleeve of said plate, and the hub 272 of a foot operated lever 273 (corresponding to the conventional clutch pedal lever) is keyed as at 274 upon the outer end of sleeve 267. A nut and washer assembly 275 maintains the hubs and sleeve in position upon the spindle. Lever 273 carries a shank 276 connected to a foot pedal (not shown). When the latter is depressed, the lever 273 is oscillated to oscillate sleeve 267 and plate 266, the segment 265 of which in turn actuates the valve sleeve 261. It will thus be seen that the valve 247 is oscillated, the extent of its movement being dependent upon the distance through which the foot pedal is depressed. A tension spring 277 acts upon an arm 278 carried by plate 266, (see Figure VII) constantly urging the valve and its operating mechanism in a direction reverse to that caused by pedal depression. In order to definitely fix the distances through which the pedal must be moved to secure accurate settings of the valve in its several operative positions, manually adjustable selecting and latching means are provided, as follows:

The plate 266 (see Figure VII) has an upstanding lug 279 in which are cut three stepped notches designated from left to right as "Hydraulic lock", "Forward automatic" and "Neutral" respectively. Directly above this lug a small casing 281 is secured to the main transmission housing, which casing is open from top to bottom to receive a vertical reciprocating plunger 282. This plunger at its lower end carries an integral latching member 283 that is adapted to be raised or lowered to cooperate with any one of the three notches above described. A recess 284 is cut in the outer surface of plunger 282 to receive an eccentric cam 285 formed on one end of an actuating shaft 286. This shaft is journaled in a cap 287 with its outer end clamped within and adapted to be oscillated by a control arm 288. Oscillation of said arm causes the eccentric cam to engage the recessed portion of the plunger to reciprocate the latter. A link 289 (see Figure VIII) has one end pivotally connected to arm 288 and the other freely pivoted to the lower end of a bell crank 291, which latter is freely fulcrumed at 292 upon a stationary frame member 293. The dashboard 294 of the vehicle supports a small casing 295 through which and the dash a control rod 296 is adapted to slide. The lower end of rod 296 is pivotally connected to the upper end of bell crank 291, and the upper end carries a knob 297 that may be manipulated by the driver to reciprocate said rod. There are three peripheral grooves cut on rod 296, these being designated as "Hydraulic lock", "Forward automatic" and "Neutral" respectively, and being adapted to yieldably receive the end of a small plunger 298 which is slidably mounted in casing 295 and pressed downwardly by a coil spring 299. The mechanisms just described are so coordinated during assembly that, with the control rod 296 in the position illustrated and the clutch pedal depressed to place lug 279 in the position shown, the latch 283 fits into the "Forward automatic" notch to prevent spring 277 from turning the lug in a clockwise direction. If knob 297 should now be pulled outwardly until plunger 298 engaged with the lowermost groove on rod 296, the latch 283 would be lifted sufficiently to permit it to engage the foremost notch in lug 279 (as spring 277 oscillated the latter) and the unit would then be operating in "Hydraulic lock" or "High". Upon complete depression of the foot pedal at any time, followed by pushing knob 297 down against the dash, the latch 283 would assume a position within the "Neutral" notch while the valve 247 would interconnect both sides of the pump and allow the capacity to become zero.

With reference to Figures I and III, a fluid reservoir 301 is formed in the housing 12 just above the fluid distributing block. This reservoir is closed by a cover plate 302 having a conduit 303 through which operating fluid may be supplied from any convenient source at atmospheric pressure. A hole 304 (Figure I) establishes communication between the reservoir 301 and the L. P. passages 130, which hole has threaded therein a valve assembly comprising a cage 305, a ball 306 and an upper hollow plug 307 providing a seat for the ball. Several ports 308 are provided in the bottom of the cage in order that the ball may normally rest thereon under the action of gravity without disrupting communication between the reservoir and L. P. passages. Any air entrained in the fluid circulating system may escape through this valve assembly but, should the pressure in the L. P. passages suddenly rise from any cause, the oil therein would hurl the ball 306 upwardly against its seat on plug 307 and thereby prevent escape of the operating oil from the system.

Referring again to Figures I and III, a pair of cages 309 and 311, similar to cage 305, are screwed from the reservoir 301 into the H. P. reservoir 131 of the distributing block 128. Cage 309 receives a plug 312 having a hole 313 therein normally closed by a ball 314 and a relatively light compression spring 315. There is a hole 316 in the bottom of the cage. Should the H. P. reservoir, for any reason whatsoever, suddenly have its pressure rendered sub-atmospheric, the ball 314 would immediately be drawn down off its seat to permit oil from reservoir 301 to enter the H. P. reservoir and eliminate such sub-atmospheric condition. The cage 311 threadedly receives a small upright casing 317 which has a number of relief holes 318 around its periphery. These holes open into a hollow interior which in turn communicates with H. P. reservoir by way of cage 311 and a hole 319 in the bottom of said cage. A ball 321 normally closes hole 319, being urged thereagainst by a coil spring 322. The compression of said spring may be varied by a stem 323 screwed into casing 317 and locked in position by a nut 324. This valve assembly, as will be obvious, forms a safety valve to permit escape of oil from the H. P. reservoir to the atmospheric reservoir 301 whenever a predetermined maximum pressure is developed in the former.

A pipe 325 (see Figure III) delivers a cooling medium to prevent overheating of the transmission during operation, this medium being circulated through chambers 326 which are formed in housing 12 about the distributing block 128, after which it exits through a pipe 327.

A pipe coupling 328 is screwed into the bottom part of housing 12 adjacent the flywheel to draw off any leakage fluid from the circulating system. This fluid may be returned through conduit 329 to the fluid reservoir 301 by any suitable means (not shown). An annular piece of sheet metal 331, secured within the housing 12 by screws 332 and surrounding a portion of the flywheel prevents access of this leakage fluid to the flywheel casing 16.

The modified form of hydraulic transmission unit illustrated in Figure IX differs in but few respects from that above described. It has been specially designed and proportioned so that it is compact and of a size to permit its substitution in the present Model A Ford chassis for the comparatively unsatisfactory mechanical unit now employed therein. In Figure IX, the housing sections 12', 13', and 16' are of different shapes than those, 12, 13 and 16 of the other figures. Section 12' does not house the distributing block 128' but abuts the forward face thereof. Block 128' provides its own housing, with the upper reservoir 301' formed therein, whereby the unit may be conveniently assembled and disassembled. In order to shorten the unit, ball bearings 33' and 165' are substituted for the roller bearings 33 and 165, the rotor 141' of the motor has been narrowed, the width of block 128' is decreased with respect to block 128, and the sleeve 34 and nut 35 have been combined to form a shorter integral sleeve and nut 34' in Figure IX. The latter feature permits a flattened closure plate 37' to be used adjacent the flywheel. The plate 37' is provided with a central ball-shaped extension 333 that is piloted in the flywheel 22' by a bearing 334.

The wall 38 and ring housing 58 of Figure I have been reshaped and integrally combined as a single element 38' in Figure IX, which element is equipped with a peripheral set of external gear teeth 335 engaging an internal gear 336. An annular sheet 337 of pliant and flexible material is riveted to gear 336 as at 338 and secured to the flywheel 22' by an engaging ring 339 and bolts 341. The outer pump housing is thus driven flexibly and directly from the flywheel and in turn drives reactance member 31', whereas in Figure I, the reactance member 31 was coupled to the flywheel to drive the pump wall.

With further reference to Figure IX, the head 342 and bolt 343 mounted in the bottom of casing 12' are provided for cooperation with the standard Ford radius rod (not shown). A small plate 344 is secured to the lower left face of block 128' and engages the aligning plate 133' to prevent rotation of the latter. The extension 226' of motor shifting lever 123 carries a plunger 345, pressed downwardly by a spring 233' and having a pointed end for engagement with recesses 346 in the motor. An integral cam plate formation 218' takes the place of the separate plate 218 previously described and a slot 234', similar in shape to slot 234 of Figure VI, is provided therein.

An adjusting means, not shown in Figure I, is provided in the rear end of the unit of Figure IX. The rear wall 159' of the motor is provided with a recess 350 which receives one end of a spindle 347 that is journalled through housing section 12' and provided at its other (projecting) end with a square head 348. This spindle has a pinion 349 fixed thereon and in driving engagement with the rim of a reactance member 161', the latter being journaled within, and longitudinally slidable with respect to, the motor wall 159'. The reactance member 161' is threaded, as at 351, upon a bearing cage 162' that is prevented from rotating by a key 163'. It will thus be seen that spindle 347 and pinion 349 may be adjustably turned to rotate reactance member 161' and that such rotation causes the latter to move longitudinally to vary its reactance, at 160', against the motor wall 159'. This adjustment is utilized to take up any play of the balls 47 of the centrifugal balancing device and to draw all vertical running surfaces of the apparatus into proper initial engagement. A lock nut 352 on spindle 347 is provided to prevent accidental movement of the adjusting mechanism.

Any other elements which correspond in function with those of Figure I but have been slightly altered structurally, are designated with primed numerals in Figure IX.

Operation

Although the operation of the apparatus has been set forth in detail in connection with the description of the several portions thereof, a brief résumé of the method of operation will be given at this point.

To fill the apparatus an operating fluid, preferably oil, is fed into the upper reservoir 301 (or 301') with the pump slowly rotating to receive the oil from the L. P. reservoir and pass it into the H. P. reservoir. All of the various passages and recesses become filled and any entrained air gradually expelled through valve cage holes 308 during this operation. Fluid passes into the motor chambers, and at this stage it is well to rotate the motor slowly, as can readily be done by jacking up one of the rear wheels of the vehicle. The operating oil surrounds the shaft from the forward cap 37 (or 37') to the rear sealing assembly 169 (or 169'). When all of the internal passages, recesses and reservoirs have been completely filled the apparatus is ready for use as a torque multiplier.

The driver starts the vehicle engine with the latter throttled low so that, as its flywheel drives the pump housing, the control ring 86 of the pump is rotated so slowly that it remains concentric with shaft 15 with no tendency to rotate the same. The valve 247 at this time should have been in its "Neutral" position but no harm is done if it had been in "Forward automatic" instead, because unless the driver raced his engine in the latter position to cause an automatic assumption of eccentricity by the pump and consequent developed pressures, the motor would not have driven the rear wheels. Now with the controlling mechanism set for "Forward automatic" operation and the vehicle brakes released, the driver accelerates the engine, as a result of which the pump automatically assumes a working position and develops pressures which, as soon as they become great enough in the control cylinder 206 to overcome the resistance of spring 198 (Fig. IV), thrust the motor control ring to the right, giving it a large eccentricity and thereby causing it to drive the shaft 15 and start the vehicle in motion. As the vehicle picks up speed and the torque requirements become less, the pressure in control cylinder 206 decreases, as does also the motor eccentricity (capacity) with the result that the motor rotor rotates faster and more closely approaches the speed of the flywheel and pump housing. When the engine speed reaches about 1000–1200 R. P. M. centrifugal force causes the pump blades and ring 86 to extend their greatest, and the motor blades and ring 156 due to vehicle speed, become concentric with shaft 15. Since the motor does not in this condition receive any fluid the pump is no longer able to deliver its full capacity to the motor, and the fluid back pressures cause the pump housing and rotor to be hydraulically locked together, all engine torque thereby being transmitted through said rotor directly to shaft 15. At this time the driver may manipulate the control mechanism to shift valve 247 into its "High" or "Hydraulic lock" position, whereupon the unit is forced to continue in direct drive with its parts in the positions just described.

If the driver wishes to coast or to stop the vehicle, he may shift valve 247 to its "Neutral" position. If, after coming to a stop, he desires to back up, he may move valve 247 into the same position utilized for "Forward automatic", at the same time manipulating shifting lever 223 to secure the "Reverse" position indicated in Figure VI. Further modes of manual operation of the motor control ring 156 have previously been explained and no repetition here should be necessary.

Having described certain preferred embodiments of my invention with the particularity required by law, what is desired to be secured by Letters Patent and claimed as new is:—

1. A hydraulic torque-multiplying transmission unit comprising a driving member; a driven shaft; a pump mounted on said shaft and actuated by the relative rotation of said member and said shaft; means automatically varying the capacity of said pump in response to the rotative speed of said driving member; a motor mounted on said driven shaft to drive the same; means for distributing operating fluid between said pump and said motor; and means automatically varying the capacity of said motor in response to the torque demands of said driven shaft.

2. In the apparatus defined in claim 1, said apparatus having several separable running surfaces substantially normal to said driven shaft; a reactance member secured to said shaft and engaging that side of the motor which is more remote from the pump; a second reactance member secured to said shaft adjacent that side of the pump which is more remote from the motor; and means, disposed between said pump and said second reactance member, operable to prevent separation of said separable running surfaces, said means being automatic in response to reactances developed as the pump is driven by said driving member.

3. A hydraulic transmission apparatus comprising, in combination, a driving member; a driven shaft; a pump consisting of a housing portion having a flexible drive connection with said driving member and a complemental rotor portion having a flexible driving connection with said shaft; a motor for driving said shaft; a fluid distributing block mounted between said pump and said motor; and an aligning plate disposed between said pump and said block having a spherical seat upon one of them and a flat running surface engaging the other, whereby said pump is permitted a slight universal rocking movement with respect to said block.

4. In a hydraulic transmission apparatus, a shaft; a fluid circulating unit comprising a pump, a distributing means and a motor mounted in floating engagement with each other, in the order named, upon said shaft; driving means in engagement with a portion of said pump; and means, automatically operable in response to the speed of rotation of said driving means, cooperating with said shaft and said unit to force said pump, distributing means and motor into fluid sealing engagement.

5. In combination in a hydraulic transmission, a stationary casing; a shaft journaled in said casing; a power transmitting device mounted upon said shaft and having a plurality of chambers for receiving and expelling fluid, said power transmitting device embodying a surface to be maintained in fluid-sealing engagement with a portion of said stationary casing; and means, automatically operable upon rotation of said shaft, associated with said power transmitting device to maintain said fluid-sealing engagement.

6. In sub-combination, a rotary power transmitting device having a plurality of chambers for receiving and expelling fluid, said device including a ported wall for distributing said fluid; a member substantially fixed against relative movement longitudinally of the axis of rotation of said device; and centrifugally actuated means for thrusting said ported wall into fluid-sealing contact with said member.

7. In sub-combination, a shaft; a rotor mounted on said shaft; a pair of substantially parallel side walls, one at each side of said rotor; means substantially restraining one of said side walls against longitudinal movement with respect to said shaft; and balancing means connected between the other of said walls and said shaft, said balancing means including a device automatically operable, in response to rotation of said shaft, to force said walls into fluid-sealing contact with the sides of said rotor.

8. In sub-combination, a rotary shaft; a pair of radial members mounted adjacent each other on said shaft, one secured against longitudinal movement with respect to said shaft and the other shiftable longitudinally of said shaft, whereby the said members cooperate to form in effect an expansible radial chamber; means abutting one of said members and providing a pair of surfaces to be sealed against fluid leakage; and a relatively heavy substance within said chamber whereby, when said shaft is rotated, said substance flows outwardly in said chamber by centrifugal force with a tendency to expand said chamber thereby separating said radial members and effectively sealing said surfaces.

9. In the apparatus defined in claim 8, said heavy substance comprising a ring, made of deformable loaded material, and said chamber being wedge-shaped in cross-section.

10. In sub-combination, a rotary shaft; a pair of radial members mounted adjacent each other upon said shaft, one of them secured against longitudinal movement with respect to said shaft, and the other shiftable longitudinally of said shaft, whereby the said members cooperate to form in effect an expansible radial chamber; means adjacent one of said members and providing a pair of surfaces to be thrust into close surface engagement upon expansion of said radial chamber; and a relatively heavy substance within said chamber whereby, when said shaft is rotated, said substance flows outwardly in said chamber by centrifugal force with a tendency to expand said chamber thereby separating said radial members and thrusting said surfaces into engagement 11. In a hydraulic transmission apparatus, a stationary casing; a shaft journaled in said casing; a power transmitting device mounted upon said shaft and having a plurality of high and low pressure fluid chambers, said power transmitting device embodying a surface to be maintained in fluid-sealing contact with a portion of said stationary casing; a reactance member substantially immovably mounted against longitudinal movement with respect to said shaft; a hydraulic balancing device arranged between said reactance member and said power transmitting device, said balancing device including an expansible chamber in communication with one of said high pressure chambers; and means, operable by centrifugal force, associated with said power transmitting device to cooperate with said hydraulic balancing device in maintaining said fluid-sealing contact at all times during operation.

12. In a hydraulic transmission apparatus, a stationary casing; a shaft journaled in said casing; a power transmitting device mounted upon said shaft and having a plurality of high and low pressure fluid chambers, said power transmitting device embodying a surface to be maintained in fluid-sealing contact with a portion of said stationary casing; a reactance member substantially immovably mounted against longitudinal movement with respect to said shaft and cooperating with said power transmitting device to form a radial chamber; a relatively heavy deformable ring disposed within said chamber and adapted to be forced radially outwardly in response to centrifugal action, thereby to thrust said device away from said reactance member to maintain said fluid-sealing contact; and means to boost the outward expansion of said ring, comprising a fluid passage open at one end to the inner surface of said ring and in communication at its other end with the fluid in the interior of said power transmitting device.

13. A hydraulic torque-multiplying transmission unit comprising a driving member; a driven shaft; a pump driven by said driving member; a motor driving said driven shaft; means for distributing operating fluid between said pump and said motor; said unit having several separable running surfaces substantially normal to the axis of said shaft; a pair of reactance members, one adjacent that side of the motor which is more remote from the pump and the other adjacent that side of the pump which is more remote from the motor; and means, disposed between said pump and said other reactance member, operable to prevent separation of said separable running surfaces, said means being automatically actuated in response to the speed of rotation of said driving member.

14. A hydraulic transmission apparatus comprising a driving member and a driven shaft; a pump engaged by said driving member; a motor for driving said shaft; a block provided with high and low pressure passages for distributing fluid between said pump and said motor; a fluid reservoir containing low pressure fluid, disposed adjacent said block; a normally open check valve establishing communication between said reservoir and said low pressure passages; a second check valve normally closed by a spring that yields for establishing communication between said reservoir and said high pressure passages whenever the fluid pressure in the latter descends below a predetermined value; and a relief valve for preventing the attainment of abnormally high pressures in said high pressure passage.

15. A hydraulic transmission apparatus comprising a driving member and a driven shaft; a pump engaged by said driving member; a motor for driving said shaft; a block provided with longitudinally arranged high and low pressure passages for distributing fluid between said pump and said motor; and a valve assembly mounted in said block to intersect a high pressure passage, said assembly including a single ported valve, disposed transversely and adjustable at will, to selectively open said high pressure passage, close said passage, or establish communication between said passage and a low pressure passage.

16. In a hydraulic transmission unit, a pump; means for driving said pump; a motor; means driven by said motor; a valve system for controlling the distribution of fluid between said pump and said motor, said system including a manually operable valve for controlling the paths of fluid flow; means for manually operating said valve; a valve position selecting mechanism; and means rendering the manipulation of said operating means dependent upon prior manipulation of said selecting mechanism.

17. In a hydraulic transmission apparatus, a pump, means for driving said pump; a motor; means driven by said motor; and means for distributing fluid between said pump and said motor; said pump and said motor each comprising a rotor mounted on a fixed axis and housed within a control ring to form therewith working chambers, said control ring being laterally adjustable to a plurality of positions of eccentricity with respect to the rotor; and an operating mechanism connected to one of said control rings to render it manually adjustable, said mechanism including means for guiding it into, and retaining it in, any one of several selected positions.

18. A fluid pump or the like comprising a pair of complemental devices forming working fluid chambers; means for mounting one of said devices for rotation, and for linear adjustment to permit variation in the volumetric capacity of said chambers; said one device being directly responsive to its own speed of rotation for automatically varying the volumetric capacity as permitted by said mounting means.

19. In sub-combination, a fluid circulating apparatus comprising a set of complemental devices forming chambers for receiving and discharging fluid during operation; a power shaft in driving connection with one of said devices; said last mentioned device being centrifugally operable in response to its own speeds of rotation, for automatically varying the capacity of the apparatus.

20. In a hydraulic transmission, a fluid pump; a fluid motor; and means for distributing fluid between said pump and said motor; said distributing means comprising means providing concentrically arranged high and low pressure fluid chambers of almost completely annular shape in communication with the pump and motor, a valve casing overlapping said high and low pressure chambers and ported for communication therewith, and a ported valve fitted within said casing to control the flow of fluid through the latter.

21. In the combination defined in claim 20, said high and low pressure chambers surrounding the axis of the transmission in annular relationship, and said valve being transversely mounted and designed for selectively interconnecting the chambers, or stopping the fluid circulation or causing the fluid to circulate in separate high and low pressure paths.

22. In a hydraulic transmission apparatus, a driving member; a driven shaft; a pair of power transmitting devices comprising a fluid pump and a fluid motor mounted in alignment and having drive connections with said member and shaft respectively, one of said drive connections being flexible to permit one of said devices to be slightly shiftable universally relative to the axis of alignment; a stationary distributing block disposed between said pump and said motor; and a ported distributing plate mounted in fluid sealing engagement with said block and one of said devices and shaped to cause limited universal adjustment of the latter relative to said block.

ALDEN G. RAYBURN.